US008181009B2

(12) United States Patent
Watts et al.

(10) Patent No.: US 8,181,009 B2
(45) Date of Patent: May 15, 2012

(54) VLAN TAGGING OVER IPSEC TUNNELS

(75) Inventors: Andrew Watts, Melbourne, FL (US);
Bruce W. Yancy, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 592 days.

(21) Appl. No.: 12/396,505

(22) Filed: Mar. 3, 2009

(65) Prior Publication Data
US 2010/0228974 A1    Sep. 9, 2010

(51) Int. Cl.
*H04L 29/06* (2006.01)
(52) U.S. Cl. .................. 713/151; 713/168; 370/395.53
(58) Field of Classification Search .................. 713/171, 713/151, 168; 370/395.53
See application file for complete search history.

(56) References Cited

U.S. PATENT DOCUMENTS

| | | | |
|---|---|---|---|
| 6,687,245 B2 | 2/2004 | Fangman et al. | 370/356 |
| 6,894,999 B1 | 5/2005 | Acharya | 370/352 |
| 6,985,956 B2 | 1/2006 | Luke et al. | 709/229 |
| 7,068,646 B2 | 6/2006 | Fangman et al. | 370/352 |
| 7,068,647 B2 | 6/2006 | Fangman et al. | 370/352 |
| 7,089,293 B2 | 8/2006 | Grosner et al. | 709/217 |
| 7,155,518 B2 | 12/2006 | Forslow | 709/227 |
| 7,213,263 B2 | 5/2007 | Makineni et al. | 726/11 |
| 7,215,667 B1 | 5/2007 | Davis | 370/389 |
| 7,313,614 B2 | 12/2007 | Considine et al. | 709/223 |
| 7,411,975 B1 | 8/2008 | Mohaban | 370/466 |
| 7,418,473 B2 | 8/2008 | Takemura et al. | 709/203 |
| 7,489,675 B2 | 2/2009 | Wiatrowski et al. | 370/349 |
| 7,492,766 B2 | 2/2009 | Cabeca et al. | 370/389 |
| 7,844,697 B1 * | 11/2010 | Greene | 709/224 |
| 7,853,691 B2 * | 12/2010 | Elzur et al. | 709/225 |
| 2003/0174715 A1 * | 9/2003 | Yazaki | 370/397 |
| 2005/0083952 A1 * | 4/2005 | Swain | 370/401 |
| 2006/0104268 A1 | 5/2006 | Lee et al. | 370/389 |
| 2007/0109974 A1 * | 5/2007 | Cutillo et al. | 370/254 |
| 2009/0106773 A1 * | 4/2009 | Lee et al. | 719/313 |

* cited by examiner

*Primary Examiner* — Jung Kim
*Assistant Examiner* — Ghodrat Jamshidi
(74) *Attorney, Agent, or Firm* — Allen, Dyer, Doppelt, Milbrath & Gilchrist, P.A.

(57) ABSTRACT

In accordance with a nonlimiting example, a network device transfers communications data along a communications channel within an Internet Protocol (IP) network. A communications module includes a signal input connected to the communications channel of the IP network and receives an Ethernet packet having an Ethernet header and IP data. A processor is coupled to the communications module and processes the Ethernet packet. It removes the Ethernet header and adds Virtual Local Area Network (VLAN) tagging information to a padding section in the packet. In one aspect, the processor includes an encryption module that encrypts the VLAN tagging information along with the IP data. The network device includes a signal output through which the packet is transferred to a destination within the IP network over the communications channel as an IPSec tunnel.

25 Claims, 4 Drawing Sheets

VLAN TAGGING OVER IPSEC TUNNELS

FIELD OF THE INVENTION

The present invention relates to communications, and more particularly, to network devices that use virtual local area network (VLAN) tagging pass-through for secure Internet Protocol (IP) communications.

BACKGROUND OF THE INVENTION

VLAN tagged 802.1Q frames can be transported over an internet protocol (IP) network, for example, by using the Generic Routing Encapsulation (GRE) tunneling protocol that encapsulates a wide variety of network layer protocol packet types inside IP tunnels, creating a virtual point-to-point link to different routers. IEEE 802.1Q is commonly referred to as VLAN tagging and allows multiple bridged networks to share transparently the same physical network link without leaking information between the networks. Bridging occurs at the Media Access Control (MAC) layer and allows individual VLAN's to communicate with each other using switched and layer 3 capabilities. Network devices that operate using 802.1Q compatibility work in conjunction with Internet Protocol Security (IPSec) as a suite of protocols that secure internet protocol communications by authenticating and encrypting each IP packet in a data stream. GRE tunnels are usually stateless, i.e., each tunnel endpoint does not maintain information about the state or availability of the remote tunnel endpoint. The GRE protocol requires that a VLAN tagged frame be placed into an IP packet and the resulting IP packet transmitted through an IPSec tunnel. This system and method works, but has significant and unnecessary overhead, and thus, brings about the requirement for a specific network device to transfer directly VLAN tagged frames over an IPSec tunnel with minimal overhead to reduce processing and packet size overhead.

There are some known network devices and systems that encapsulate an IP frame into an IPSec encapsulating security payload (ESP) frame. ESP supports encryption-only and authentication-only configurations, but does not protect the IP packet header. In a tunnel mode, however, the original IP packet is entirely encapsulated with a new packet header added, and thus, ESP protection is afforded to the whole inner IP packet including the inner header while the outer header remains unprotected. The encapsulation surrounds the payload rather than preceding it as in the authentication header (AH) wire-level protocol often used by IPSec. Another similar protocol is layer 2 tunneling protocol (L2TP), which supports virtual private networks, but does not provide encryption or confidentiality. The L2TP packet, including payload and L2TP header, is sent within a UDP datagram.

It is desirable to provide network encryption devices that transport VLAN tagged Ethernet frames through an IPSec tunnel without using GRE or other generic mechanisms, thus, reducing processing and packet size overhead. Greater control over VLAN tagging pass-through and secure IP communications using such devices and systems are desirable.

SUMMARY OF THE INVENTION

In accordance with a non-limiting example, a network device transfers communications data along a communications channel within an Internet Protocol (IP) network. A communications module includes a signal input connected to the communications channel of the IP network and receives an Ethernet packet having an Ethernet header and IP data. A processor is coupled to the communications module and processes the Ethernet packet. It removes the Ethernet header and adds Virtual Local Area Network (VLAN) tagging information to a padding section in the packet. In one aspect, the processor includes an encryption module that encrypts the VLAN tagging information along with the IP data. The network device includes a signal output through which the packet is transferred to a destination within the IP network over the communications channel as an IPSec tunnel.

In another aspect, the processor calculates the padding required for transferring the packet and adds VLAN tagging information at the end of the padding section in the packet. The encryption module adds a unique identifier as a magic number to the padding section to indicate that the packet includes a VLAN header. The VLAN tagging information includes a VLAN header comprising tag control information copied into the padding section immediately preceding the unique identifier. The processor adjusts a Path Maximum Transmission Unit (PTMU) size an additional "n" bytes of padding.

In yet another aspect, the network device includes a user interface coupled to the processor through which a user is enabled for allowing or disallowing non-VLAN traffic. A VLAN tag source filtering table enables VLAN source filtering and enables a user for allowing or disallowing non-VLAN traffic.

The unique identifier could be added to the last four bytes of the padding section. The packet can be fragmented if necessary and the padding section calculated and the unique identifier added to any packet fragments. The unique identifier can be formed as an arbitrary number of "n" bytes, for example, as an ASCII representation of the word VLAN as a 32-bit word. At a destination, the packet is received and the VLAN tagging information restored by inserting it into a new Ethernet packet, it can then be transmitted.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
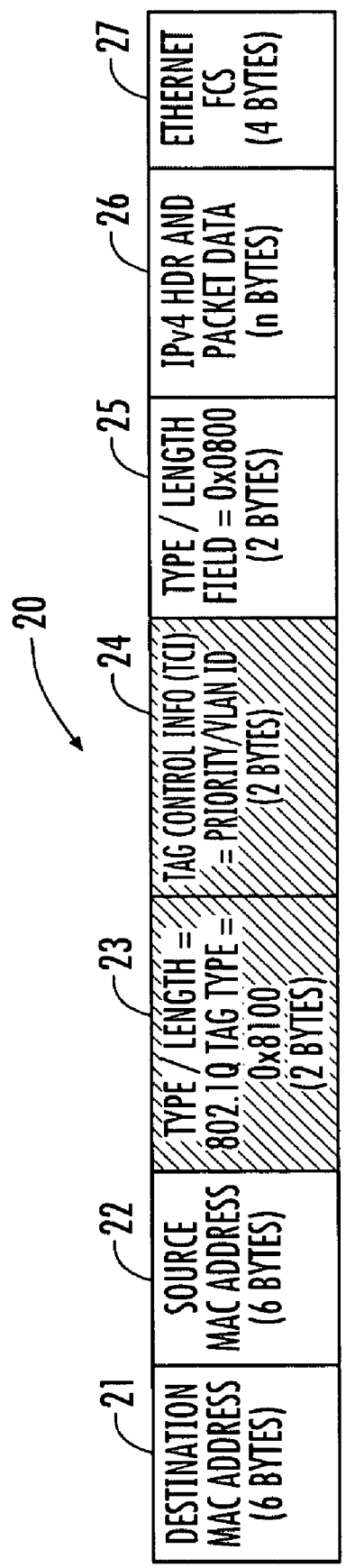
FIG. 1 is a block diagram showing a format of a standard Ethernet frame with VLAN tagging.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with a non-limiting aspect, a network device and related system and method encapsulate an IP frame into an IPSec frame, such as an ESP frame, with the VLAN information added to the padding portion of the traffic. This allows a direct transfer of VLAN tagged frames over an IPSec tunnel with minimal overhead and is applicable to generic IPSec such as RFC 3604 and similar standards. In accordance with a non-limiting aspect, the VLAN tagging information is placed in the IPSec frame directly, but the entire Ethernet packet is not copied directly into the IPSec packet. The "padding" area is used to place the VLAN tagging information to avoid corrupting packets on network devices that do not implement the protocol. VLAN tagging information is encrypted along with the rest of the IP data. The VLAN tagging information is restored by placing it into a new Ethernet frame on the other end of the tunnel.

Thus, the network device and related system and method supplies a technical solution for transporting layer 2 information, and more specifically 802.1Q/P VLAN information, over IPSec tunnels with minimal overhead. It applies to all IPSec capabilities and includes virtual private networking (VPN).

There now follows a description of the functionality used for a network device, e.g., a VPN router device such as a communications module or network device also referred to as a cryptographic device (as one non-limiting example) to support 802.1Q Virtual Local Area Network (VLAN) tagging pass-through, awareness, and full support.

Reference is now made to the IEEE Std. 802.1Q-2003, Virtual Bridged Local Area Networks; ISBN 0-7381-3662-X, the disclosures which are hereby incorporated by reference in their entirety. This section specifies a mechanism to allow multiple bridged networks to share transparently the same physical network link without leakage of information between networks (i.e., trunking). From a protocol perspective 802.1Q implies support for 802.1P, but does not include the packet prioritization functionality that is necessary to support fully 802.1P.

As described, VLAN tagging supports the encapsulating (tagging) of network traffic in a LAN to create a "virtual" LAN within the physical LAN by applying a tag to the header of a standard 802.3 frame. This VLAN tag is typically 16 bits long and contains extra information regarding how to transport the frame (priority) and the intended destination (VLAN ID) of the frame. The VLAN tagging information is primarily used to segregate large networks into multiple virtual LANs that can be managed independently using routers that support VLAN or "smart" managed switches. It can also be used to trunk several selected LANs onto one wire for transportation through a network and then separate out the individual LANs at the receiving end.

FIG. 1 shows a format of a typical Ethernet frame 20 with VLAN tagging. The various fields are illustrated. The first field is a destination MAC address field 21 that is typically six bytes. The second field is a source MAC address field 22 of six bytes. This field 22 is followed by a type/length that corresponds to the 802.1Q tag type and is typically about two bytes. The next field is a tag control information (TCI) field 24 that is about two bytes and corresponds to the priority/VLAN ID. This is followed by several fields as a type/length field 25, an IPV4 HDR (high data rate) and packet data field 26 that varies in the number of bytes. The field 26 is "n" bytes and varies depending on communications requirements. This is followed by an Ethernet FCS field 27 that is typically about four bytes corresponding to the frame check sequence (FCS).

An example of the format of the Tag Control Information (TCI) in field 24 is shown below:

| 15:13 | 12 | 11:0 |
|---|---|---|
| User_priority | CFI | VID |

The user_priority is a 3-bit field storing the priority level for the frame. Use of this field is defined in the IEEE 802.1p standard.

The canonical format indicator (CFI) identified above is typically a 1-bit indicator that is always set to zero for Ethernet switches. CFI is used for compatibility between Ethernet and Token Ring networks. If a frame received at an Ethernet port has a CFI set to 1, then that frame should not be bridged to an untagged port.

The VLAN ID (VID) is typically a 12-bit field specifying the VLAN to which the frame belongs. A value of 0 typically indicates that the frame does not belong to any VLAN. In that case, the 802.1Q tag specifies a priority and is referred to as a priority tag. A value of hex FFF typically is reserved for implementation use. All other values may be used as VLAN identifiers, allowing up to 4094 VLAN's. On bridges, VLAN 1 is often reserved for management.

A network device using this protocol can support VLAN in typically one of five ways allowing different levels of VLAN support. A network device using this protocol can drop VLAN tagged frames since the technique used to support VLAN adds additional data to the header of an 802.3 frame. This makes the header of the frame larger. This additional data can confuse older networking equipment and consider the frame as erroneous, and thus drop the frame.

The network device also functions for VLAN stripping. The network device identifies and strips off the VLAN tagging information from the Ethernet frame. The IP contents of the remaining, now standard format Ethernet frame are then processed like any other non-VLAN tagged Ethernet frame.

The network device can operate in pass-through. If the networking device recognizes the frame as a VLAN tagged frame, it could pass it through at the Ethernet layer (ISO Layer 2), but not act upon the contents of the VLAN tag. This is still problematic if an upper layer strips the 802.3 headers off to transport the packet, which generally occurs in network devices that convert from one type of Layer 2 protocol to another, or if only layer 3 data is transported in another layer 3 protocol such as an IPSec device. This could be the minimum implementation required for a network device.

The network device can operate with awareness. Minimal support for VLAN tagging can be provided by designing a network device that is aware of the tagging information in the VLAN tag. The network device parses the tag data and source filters based on the information in the tag. For example, if the network device is configured to pass only VLAN tag ID 5, then the network device will pass only 802.3 frames that have been tagged with a VLAN tag, indicating VLAN ID 5. All other frames would be dropped. This implementation is useful for edge devices/gateways to restrict/limit traffic that passes through them only to a specific VLAN.

The network device can operate with full support. In order to fully realize the usefulness of the VLAN tagging, a device can pass VLAN information and add or remove VLAN tagging to raw Ethernet traffic and provide the VLAN tag to the rest of the network for transport. It can also prioritize queues based on 802.1Q priority on packets being processed and pass-through QOS (Quality of Service) header data (802.1Q) in the tunnels. This capability, in addition to VLAN awareness, is what routers that support VLAN and manage switches accomplish.

In accordance with non-limiting examples, these technical problems are overcome by encapsulating the IP frame into an IPSec ESP frame in which the VLAN information is added to the padding portion of the packet. The VLAN tag information is taken from the Ethernet layer as layer 2. The packet is processed as normal. Before a network device (or system) calculates the padding for the packet, the VLAN tag is added to the end of the padding section. Overhead for the device and related system and method can range from about 8 to about 24 bytes depending on the amount of required padding. Typically, IPSec requires that the packet fall on 32-byte boundaries, which is significantly less overhead than using GRE tunneling. This typically requires zero configuration on the part of the user.

Figure 2:
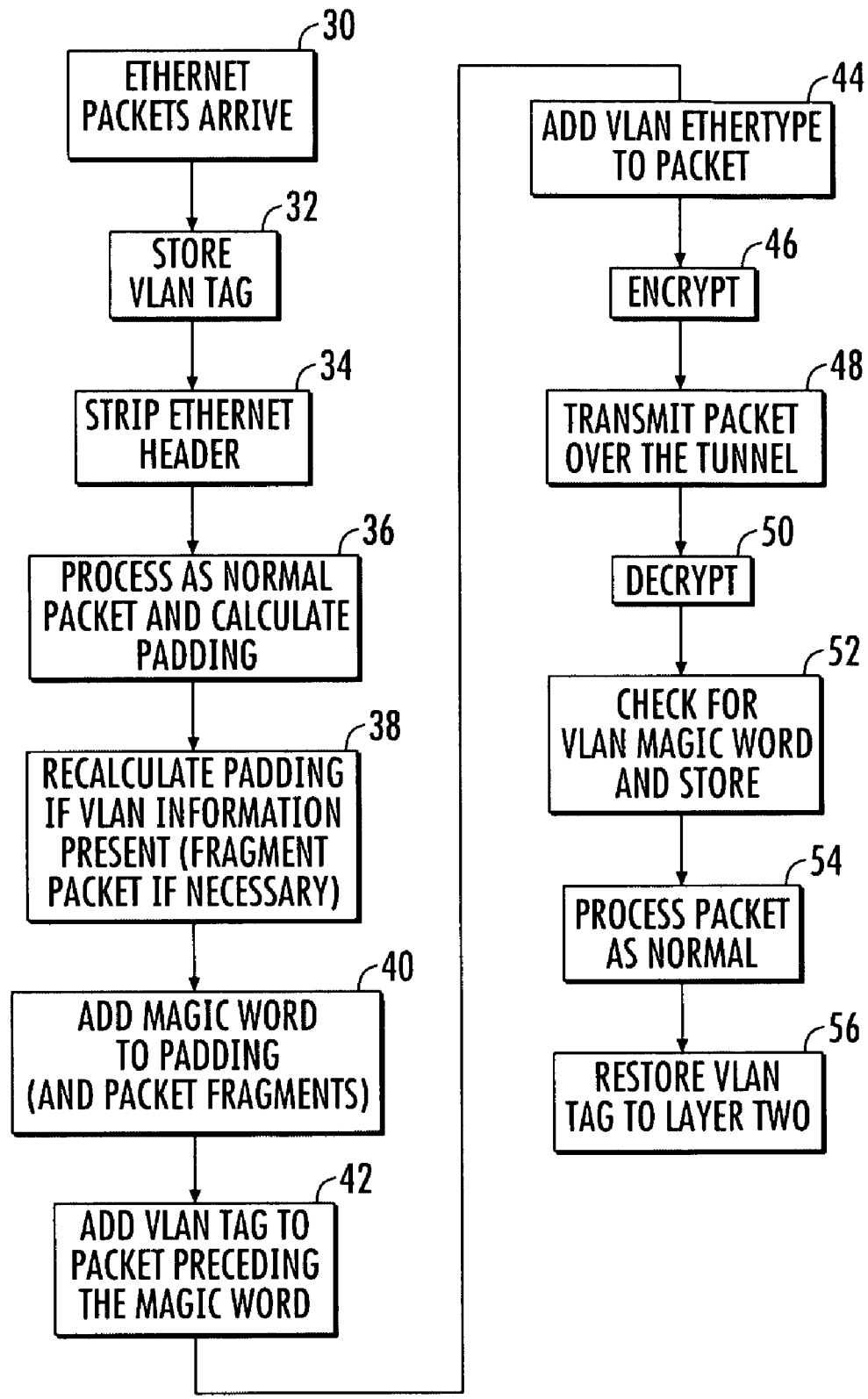
FIG. 2 is a high-level flowchart showing an example of the sequence of steps for the method of VLAN tagging over IPSec tunnels and encapsulating the IP frame into an IPSec frame with the VLAN information added to the padding portion of the packet in accordance with a non-limiting aspect.

A more detailed example of this process as just described is shown in FIG. 2. As illustrated in the high-level flowchart, Ethernet packets arrive into the IP stack (block 30). If a VLAN tag is present, it is stored (block 32). The Ethernet header is stripped (block 34). This destroys the level two data. The packet is processed as normal (block 36) and the padding calculated. The padding is recalculated if the VLAN information is present and, if necessary, the packet is fragmented (block 38). A VLAN magic word of about four bytes is added to the last four bytes of the padding and any packet fragments (block 40). The VLAN tag of about two bytes is added preceding the magic word to the packet and any fragments (block 42). The VLAN Ethertype of about two bytes is added preceding the VLAN tag to the packet and any fragments (block 44). The Ethertype is typically used to indicate which protocol is encapsulated in frame data. Encryption occurs (block 46) and the packet is transmitted over the tunnel (block 48). The packet is decrypted (block 50) and a check is made for the VLAN tag magic word, and it is stored (block 52). The packet is processed as normal (block 54) and the VLAN tag, if present, restored to layer two before transmitting over the wire (block 56).

Some network devices will accept and properly handle [TYPE=8100] 802.1Q packets. In an example, 0800 and 0806 packets are accepted while others were dropped. These network devices could pass the 802.1Q packet to the appropriate destination, which is assumed to be another VLAN router, through an IPSec tunnel.

The network devices as described have various applications as different use cases. For example, a network device forms a network having point-point/point-multipoint wireless bridge modes linking VLAN routers through two or more network devices or commercial infrastructure connectivity to reach back to another network fronting a VLAN router.

The network device typically will copy the Ethertype field and the VLAN tag into the last two bytes of the padding area of a IPSec packet. At least four bytes are added to the pad if no padding was necessary on the original packet. At the receiving end, the IPSec unwrap function will look at the location in the pad 4 bytes from the IPSec trailer to determine if the packet had VLAN tagging or not. If so, that location would contain an 0x8100 and the unwrap function would send the VLAN tagging information to the Ethernet layer to be added onto the outgoing packet destined for the red network. If not, the packet is processed like it is now.

A number of steps and sequences can be accomplished as will now be described.

The network device supports VLAN pass-through by recognizing the 0x8100 Ethertype and copying the VLAN tagging from an incoming 802.1Q tagged Ethernet frame into the packet structure of the corresponding outgoing packet in such a way as to transport the VLAN tagging through the IPSec tunnel without effecting the interoperability of network devices with other IPSec in-line network encryption (INE). The network device reverses the packet formatting on the receive side to provide the standard Ethernet packet with VLAN tagging intact to the receiving network. Other non-network devices will ignore the VLAN tagging data in the padding, and pass the packet without the VLAN tagging data.

The network device inserts a four-byte field containing a magic number into the padding area immediately preceding the ESP Trailer in the associated ESP packet. This magic number is used on the receiving side to indicate that the packet has a VLAN header embedded in the padding. The placement of the magic number immediately preceding the ESP trailer for the VLAN implementation is chosen such that other magic numbers may be easily substituted and used in the future to indicate different layer two encapsulations.

Figure 3:
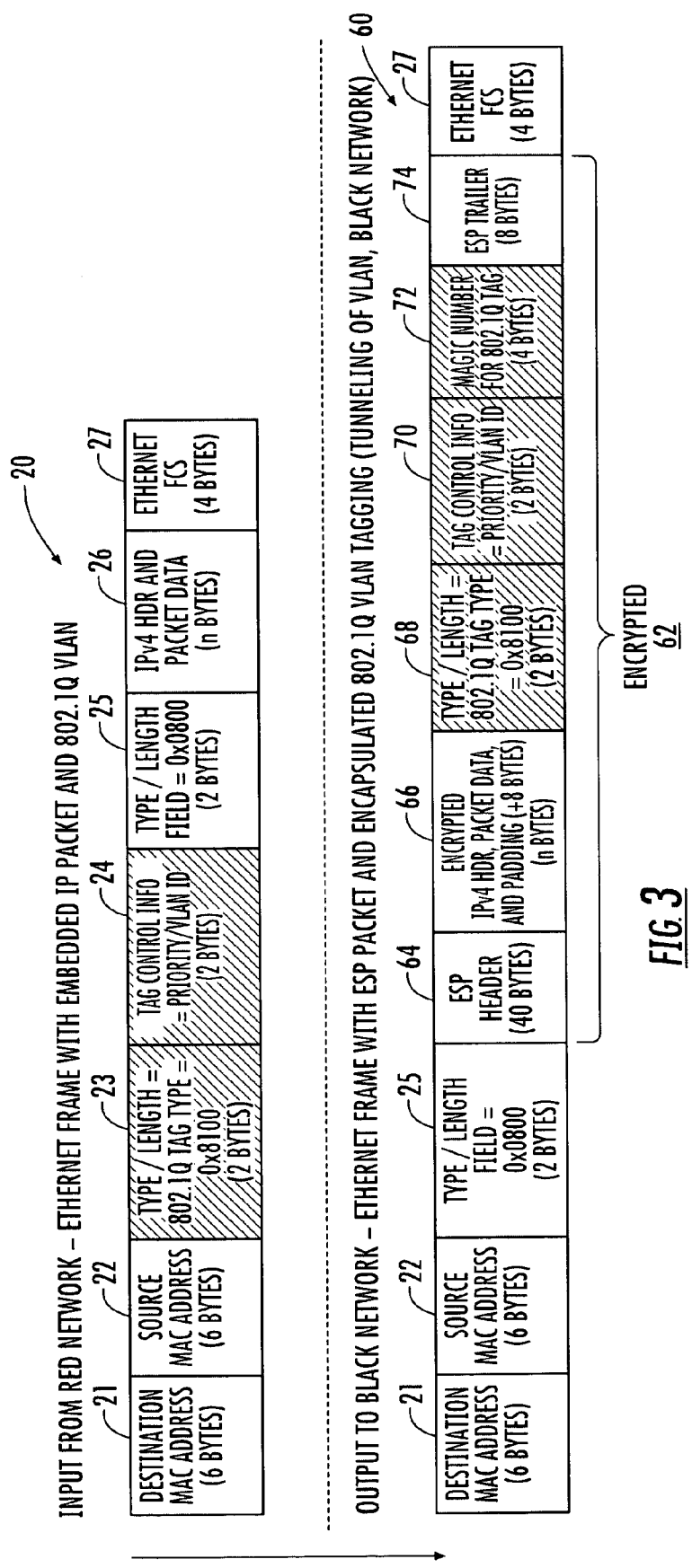
FIG. 3 is a block diagram showing a packet format for VLAN pass-through packet in accordance with a non-limiting aspect.

The network device uses the packet format and encapsulation technique as shown in FIG. 3.

The top portion of FIG. 3 shows an input from a red side of a network device corresponding to the secure side of the network device with the Ethernet frame embedded IP packet and 802.1Q VLAN such as shown in FIG. 1. The output is to a black network as a public or unsecured network and shown by the block diagram for the frame 60 having the Ethernet frame with the ESP packet and encapsulated 802.1Q VLAN tagging for tunneling of VLAN in black network processing. The destination MAC address field 21, source MAC address field 22 and type/length field 25 for the first three blocks are the same as in the top portion and what is shown in FIG. 1. The encrypted section 62 includes a plurality of data fields. A first field is an IPSec field such as an ESP header field 64 of about 40 bytes. The next field is an encrypted field of n bytes with the various IPv4 HDR, packet data and padding similar to that shown in the IPv4 HDR field 26 in FIG. 1, but this time encrypted and including padding. The type/length field 68 and tag control info field 70 are similar to those fields 23, 24 shown in FIG. 1, but this time part of the encrypted section 62. The next field is a magic number field 72 for the 802.1Q tag and is about four bytes. This is followed by the ESP trailer field 74 of about eight bytes.

The magic number as expressed by the magic number field 72 for the 802.1Q tag denotes the particular IP frame that contains the VLAN tagging and is used to bring data out from layer three and bring the data back into layer two when the packet is decrypted. The magic number operates as an indicator to prove this packet has the information that the system will look for. The magic number operates as a unique identifier and can be an arbitrary number. For example, in one non-limiting example, the magic number is an ASCII representation of the word VLAN as a 32-byte word. It is necessary to have a unique identifier instead of what is typically used in padding such as all 1's or all 0's because the chances of more random numbers being chosen and hit are high. Thus, a relatively high unique number is chosen to write the code around and look for a particular sequence to increase the probability that someone will not accidentally place a number in the pad and mistakenly pull the data and expect it to be VLAN information.

A network device copies the Tag Control Information from the VLAN header of the red source packet into the padding area immediately preceding the magic number in the associated ESP packet. The network device inserts a two-byte field containing 0x8100 into the padding area immediately preceding the copied Tag Control information in the associated ESP packet. The Ethertype field containing 0x8100 is not copied, but is hard coded and inserted instead for security reasons. The network device calculates and inserts the appropriate padding into the associated ESP packet to compensate for the insertion of the 8 bytes of data from the combination of the VLAN tagging information and the magic word.

In order to accommodate the extra padding required for VLAN tagging in the padding area, the Path Maximum Transmission Unit (PMTU) size is adjusted for VLAN tagged frames for an additional 48 bytes of padding. For example, packets with a Don't Fragment (DF) bit set that exceeds the PMTU size in the network device after VLAN tagging has been taken into consideration are dropped and a Type 3, Code 4, Internal Message Control Message Protocol (ICMP) error message sent to the host. The PMTU size advertised to the host in an ICMP error message is 48 bytes lower than the actual PMTU of the network. The actual PMTU size for the network device remains unchanged. Packets received by the network device that exceed the PMTU size of the network but do not have the DF bit set will fragment the packet and accommodate the VLAN tagging in the padding while staying on a 48 byte boundary.

The microcode for a home network processor (HNP) controls acceptance of VLAN packets and is typically installed and enabled on NPE-B (null pointer exception) of a IXP-425 processor in one non-limiting example such as produced by Intel Corporation. The microcode for the HNP that controls acceptance of VLAN packets can be disabled on the NPE-C of the IXP425.

If an incoming packet matches any entry in the source filter, it is encapsulated in an IPSec packet structure, as noted above in the pass-through requirements, and is sent to the receiving network device to be de-encapsulated and forwarded to the destination red network (VLAN). The network device maintains a VLAN Tag Source Filtering table that can accommodate from 0 to 256 entries. The network device VLAN tag source filtering table allows entry values from 0 to 4096, and in any constituent combination thereof (e.g., 599; or 0, 1, 3, 54, 679; or 1115, 4007, 11, as non-limiting examples). The network device allows an administrator to enable/disable VLAN source filtering. If VLAN source filtering is enabled, the network device permits an administrator to allow/disallow non-VLAN traffic. The network device also allows a user or administrator to add or remove VLAN ID's from the VLAN tag source filtering table in a device through a human machine interface (HMI). The network device also parses through and performs source filtering on incoming red packets and, based on the VLAN ID in the VLAN tag of the incoming packet, drops packets that do not match the VLAN ID(s) that are in the VLAN source filter of the device. The network device also accepts and processes (encrypts) packets that do not have VLAN tagging, as originally designed, when VLAN filtering is turned off, or if VLAN filtering is on but the administrator has allowed processing non-VLAN packets via the HMI.

There are also other possibilities, for example, supporting a GRE (Generic Routing Encapsulation) tunneling technique will place the entire Ethernet protocol frame including VLAN tagging in a generic IP packet that can be sent through IPSec packets to any EPSEC. This adds overhead, but maintains HAIPE interoperability while still fully supporting the pass-through of VLAN tagging.

Figure 4:
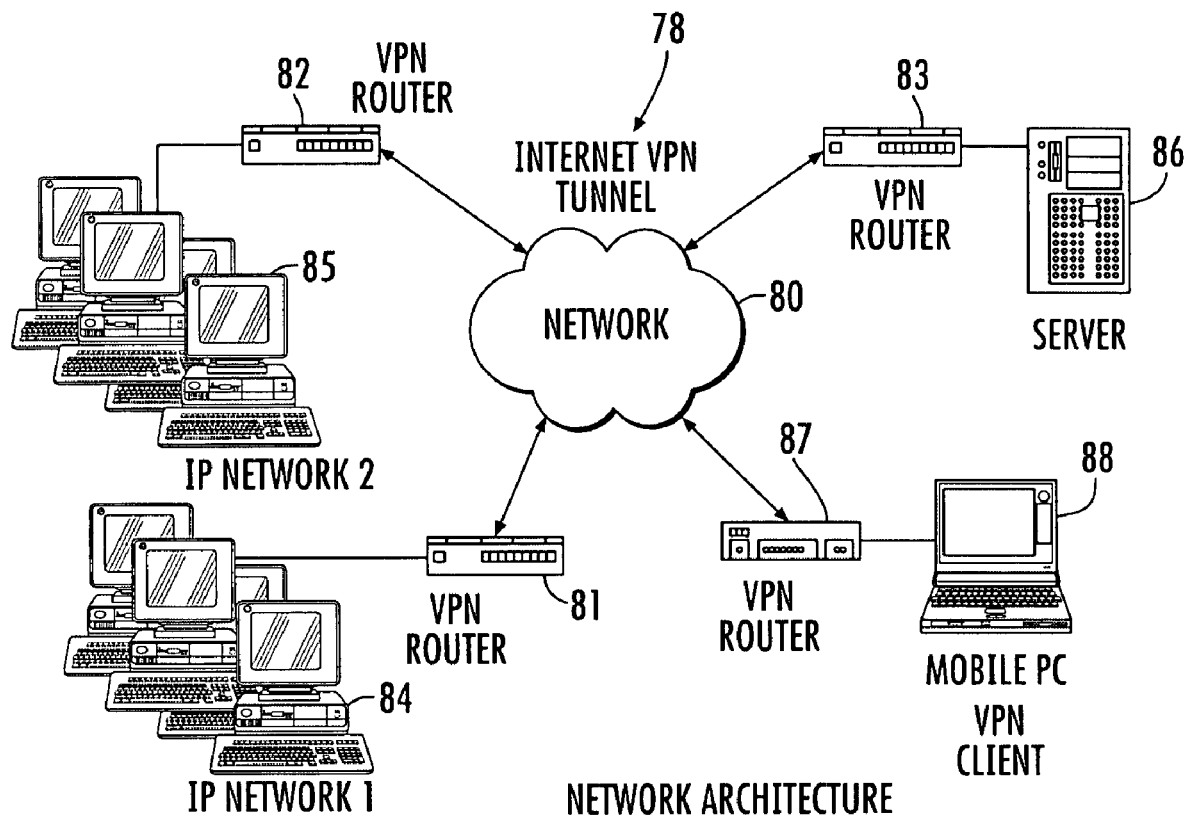
FIG. 4 is an example of a block diagram illustrating an IP network architecture showing VLAN routers that could be used with the network device, system and method as described relative to FIGS. 2 and 3.

FIG. 4 is an example of a network architecture 78 that includes an IP network 80 that could have a network portion operating as an internet VPN tunnel and connected to VPN routers 81, 82, 83, 87. VPN router 81 is connected to IP network one (84) and VPN router 82 is connected to IP network two (85). VPN router 83 is connected to a server 86 and VPN router 87 is connected to a mobile PC 88 that could operate as a VPN client. Although these are only example components, any type of internet VPN tunnel and network systems could be used. The different VPN routers could operate as broadband routers and have a network address translation (NAT) firewall and different types of Ethernet ports such as a 10/100 Mbps Ethernet port. It could integrate with different fast Ethernet switches and support dynamic VPN settings.

This communication system shown in FIG. 4 is set forth as an example of a type of system that can incorporate an encryption module and security policy object distribution system. A SecNet 54 device is a possibility as manufactured by Harris Corporation. Further details of different cryptographic devices are set forth in commonly assigned U.S. patent application Ser. Nos. 10/806,667 and 10/806,949, both filed Mar. 23, 2004, and Ser. No. 10/926,451, filed Aug. 25, 2004, the disclosures which are hereby incorporated by reference in their entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A network device that transfers communications data along a communications channel within an Internet Protocol (IP) network, comprising:
   a communications module having a signal input connected to the communications channel of the IP network that receives an Ethernet packet having an Ethernet header and IP data;
   a processor coupled to the communications module that processes the Ethernet packet and removes the Ethernet header and adds Virtual Local Area Network (VLAN) tagging information to a padding section in the packet at the end of the IP data, said processor including an encryption module that encrypts the VLAN tagging information along with the IP data;
   and a signal output through which the packet is transferred to a destination within the IP network over the communications channel as an IPSec tunnel.

2. The network device according to claim 1, wherein said processor calculates the padding required for transferring the packet and adds VLAN tagging information at the end of the padding section in the packet.

3. The network device according to claim 1, wherein said encryption module adds a unique identifier as a magic number to the padding section to indicate that the packet includes a VLAN header.

4. The network device according to claim 1, wherein said VLAN tagging information includes a VLAN header comprising tag control information copied into the padding section immediately preceding the unique identifier.

5. The network device according to claim 1, wherein said processor adjusts a Path Maximum Transmission Unit (PTMU) size an additional "n" bytes of padding.

6. The network device according to claim 1, and further comprising a user interface coupled to the processor through which a user is enabled for allowing or disallowing non-VLAN traffic.

7. The network device according to claim 6, and further comprising a VLAN tag source filtering table for enabling a VLAN source filtering and enabling a user for allowing or disallowing non-VLAN traffic.

8. A method of transferring communications data comprising:
receiving an Ethernet packet having an Ethernet header and Internet Protocol (IP) data within a network device in an IP network;
processing the Ethernet packet a encryption processor of the network device and removing the Ethernet header;
adding Virtual Local Area Network (VLAN) tagging information to a padding section in the packet at the end of the IP data;
encrypting the VLAN tagging information along with the IP data within an encryption module of the processor;
and transferring the packet to a destination within the IP network over an IPSec tunnel.

9. The method according to claim 8, and further comprising calculating within the encryption processor the padding required for transferring the packet and adding VLAN tagging information at the end of the padding section in the packet.

10. The method according to claim 8, and further comprising adding a unique identifier as a magic number to the padding section to indicate that the packet includes a VLAN header as VLAN tagging information.

11. The method according to claim 10, and further comprising adding the unique identifier to the last four bytes of the padding section.

12. The method according to claim 10, and further comprising calculating a padding section and fragmenting the packet if necessary and adding the unique identifier to any packet fragments.

13. The method according to claim 10, and further comprising forming the unique identifier as an arbitrary number.

14. The method according to claim 13, and further comprising forming the unique identifier as an ASCII representation of the word VLAN as a 32-bit word.

15. The method according to claim 10, and further comprising receiving the packet at the destination and restoring the VLAN tagging information by inserting it into a new Ethernet packet and transmitting the Ethernet packet.

16. A method of transferring communications data; comprising: receiving an Ethernet packet having an Ethernet header and Internet Protocol (IP) data within a network device that operates as an interface gateway for an IP network;
processing the Ethernet packet within a processor of the network device and removing the Ethernet header;
adding Virtual Local Area Network (VLAN) tagging information to a padding section in the packet at the end of the IP data, the VLAN tagging information comprising a unique identifier as a magic number and VLAN header wherein the unique identifier indicates that the packet includes a VLAN header as VLAN tagging information, said VLAN header comprising tag control information that is copied into the padding section immediately preceding the unique identifier;
encrypting the VLAN tagging information along with the IP data within an encryption module of the processor;
and transferring the packet to a destination within the IP network over an IPSec tunnel.

17. The method according to claim 16, and further comprising adjusting a Path Maximum Transmission Unit (PTMU) size an additional "n" bytes of padding.

18. The method according to claim 16, wherein the network device comprises a user interface coupled to the encryption processor through which a user is enabled for allowing or disallowing non-VLAN traffic.

19. The method according to claim 18, and further comprising maintaining a VLAN tag source filtering table within the network device and enabling a VLAN source filtering for enabling a user for allowing or disallowing non-VLAN traffic.

20. The method according to claim 16, and further comprising calculating within the processor the padding required for transferring the packet and adding VLAN tagging information at the end of the padding section in the packet.

21. The method according to claim 16, and further comprising adding the unique identifier to the last four bytes of the padding section.

22. The method according to claim 16, and further comprising calculating a padding section and fragmenting the packet if necessary and adding the unique identifier to any packet fragments.

23. The method according to claim 16, and further comprising forming the unique identifier as an arbitrary number.

24. The method according to claim 23, and further comprising forming the unique identifier as an ASCII representation of the word VLAN as a 32-bit word.

25. The method according to claim 16, and further comprising receiving the packet at the destination and restoring the VLAN tagging information by inserting it into a new Ethernet packet and transmitting the Ethernet packet.

* * * * *